(12) United States Patent
Whitlow

(10) Patent No.: US 7,010,717 B2
(45) Date of Patent: Mar. 7, 2006

(54) FACILITY CREATION PROCESS FOR CLUSTERED SERVERS

(75) Inventor: Troy Charles Whitlow, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 572 days.

(21) Appl. No.: 10/208,097

(22) Filed: Jul. 29, 2002

(65) Prior Publication Data

US 2004/0019820 A1    Jan. 29, 2004

(51) Int. Cl.
    *G06F 11/00*    (2006.01)
(52) U.S. Cl. .............................. 714/4; 714/6
(58) Field of Classification Search ............ 714/4, 714/6
    See application file for complete search history.

(56) References Cited

U.S. PATENT DOCUMENTS

| | | | |
|---|---|---|---|
| 6,173,420 B1 | 1/2001 | Sunkara et al. | |
| 6,230,185 B1 | 5/2001 | Salas et al. | |
| 6,233,600 B1 | 5/2001 | Salas et al. | |
| 6,314,408 B1 | 11/2001 | Salas et al. | |
| 6,360,331 B1 * | 3/2002 | Vert et al. | 714/4 |
| 6,363,497 B1 | 3/2002 | Chrabaszcz | |
| 6,446,218 B1 | 9/2002 | D'Souza | |
| 6,453,426 B1 | 9/2002 | Gamache et al. | |
| 6,453,468 B1 | 9/2002 | D'Souza | |
| 6,594,786 B1 | 7/2003 | Connelly et al. | |
| 6,728,896 B1 * | 4/2004 | Forbes et al. | 714/4 |
| 6,779,093 B1 * | 8/2004 | Gupta | 711/162 |
| 6,801,949 B1 | 10/2004 | Bruck et al. | |
| 6,820,136 B1 * | 11/2004 | Pham et al. | 709/248 |
| 6,857,082 B1 | 2/2005 | Josan et al. | |
| 6,859,834 B1 * | 2/2005 | Arora et al. | 709/227 |
| 6,871,300 B1 * | 3/2005 | Irving | 714/47 |
| 6,895,534 B1 | 5/2005 | Wong et al. | |
| 2002/0002607 A1 | 1/2002 | Ludovici et al. | |
| 2002/0161875 A1 | 10/2002 | Raymond | |
| 2003/0105732 A1 * | 6/2003 | Kagalwala et al. | 707/1 |

FOREIGN PATENT DOCUMENTS

WO    WO 02/48866 A2    6/2002

OTHER PUBLICATIONS

Microsoft Corporation, Internet Information Services 5.0 Technical Overview, 1999, Microsoft Corporation, pp. 6-7 and 11.*

(Continued)

*Primary Examiner*—Scott Baderman
*Assistant Examiner*—Paul F. Contino

(57) ABSTRACT

A method of creating a facility in a clustered server configuration, includes: creating a facility on a first cluster node; adding facility registry keys to a resource in the cluster group, the registry keys comprising a facility key, a full text key, open database connectivity format keys, and connectivity information keys; performing a fail-over operation of the cluster group from the first cluster node to the second cluster node; resetting a password for the open database connectivity for the added facility; and removing the added facility registry keys to prevent replication back to the first cluster node. An apparatus for providing a facility in a cluster server configuration, includes: a first cluster node; a second cluster node; a shared disk system coupled to the first cluster node and second cluster node; where a facility can be created on the first cluster node.

45 Claims, 4 Drawing Sheets

OTHER PUBLICATIONS eRoom Technology, Inc., What's New in eRoom Version 6: A Summary of New Features, May. 10, 2002, eRoom Technology Inc., p. 5.* eRoom Technology, Inc., eRoom v6 Add-on Software Downloads, Jul. 18, 2002, http://web.archive.org/web/20021210164719/www.eroom.com/CC_content/addon.asp.*

RSA SecurID, RSA SecurID Ready Implementation Guide, Mar. 12, 2002, RSA SecurID, p. 4.*

"Multipurpose Web Publishing Using HTML, XML, and CSS" by Lie et al., Communications of the ACM, ACM, USA, vol. 42, No. 10, Oct. 1999, pp. 95-101.

"Atomic Writes for Data Integrity and Consistency in Shared Storage Devices for Clusters" by M. Okun, et al. Proceedings of the Fifth International Conference on Algorithms and Architectures for Parallel Processing, 2002; Oct. 23-25, 2002 Total pp.: 7.

* cited by examiner

FACILITY CREATION PROCESS FOR CLUSTERED SERVERS

CROSS REFERENCE TO RELATED APPLICATION

This is application has common subject matter with co-pending application having application Ser. No. 10/097,989, filed Mar. 13, 2002, and entitled "HIGH AVAILABILITY ENHANCEMENT FOR SERVERS USING STRUCTURED QUERY LANGUAGE (SQL)".

TECHNICAL FIELD

Embodiments of the present invention relate generally to communication networks. More particularly, embodiments of the present invention provide an apparatus and method for creating a new facility in cluster nodes.

BACKGROUND

Web collaboration and e-business solutions may be provided by use of an application known as the eRoom server application ("eRoom") from eROOM TECHNOLOGIES, INCORPORATED. eRoom can run on the MICROSOFT WINDOWS 2000 server family of products from MICROSOFT CORPORATION, Redmond, Wa. One version of eRoom can be deployed using either a built-in database engine which utilizes SQLAnywhere or deployed using the Microsoft SQL 2000 server or SQL Server 7 database. Both deployment methods are stand-alone installations, meaning that the eRoom and SQLAnywhere run on the same machine with no redundancy. When used with Microsoft SQL, the database engine can reside locally on the eRoom server or on a different server.

Both deployment methods do not provide for redundancy or high availability features. For example, the eRoom server application does not support the Microsoft Clustering Service as a native feature. Instead, methods, such as fault tolerant hardware and disk configurations combined with full system backups, are the current and non-robust techniques to protect an eRoom instance.

Therefore, current technologies, such as eRoom, are unable to support a clustered highly available instance which would be useful in, for example, critical applications or in an environment with many users. For example, the eRoom application does not support clustering as a native feature and is advertised as a stand-alone application.

Furthermore, novel solutions would be required for creating a new facility if more robust-techniques are used to protect an eRoom instance.

Therefore, current technologies are limited in their capabilities and suffer from at least the above constraints.

SUMMARY OF EMBODIMENTS OF THE INVENTION

In one embodiment of the invention, a method of creating a facility in a clustered server configuration, includes:
  creating a facility on a first cluster node;
  adding facility registry keys to a resource in the cluster group, the registry keys comprising a facility key, a full text key, open database connectivity format keys, and a connectivity information key;
  performing a fail-over operation of the cluster group from the first cluster node to the second cluster node;
  resetting a password for the open database connectivity for the added facility; and
  removing the added facility registry keys to prevent replication back to the first cluster node.

Testing of the new added facility may also be performed. A fail-over operation of the cluster group to the first cluster node may also then be performed.

In another embodiment of the invention, an apparatus for providing a facility in a cluster server configuration, includes: a first cluster node; a second cluster node; a shared disk system coupled to the first cluster node and second cluster node; where a facility can be created on the first cluster node, where facility registry keys are added to a resource in the cluster group, the registry keys comprising a facility key, a full text key, open database connectivity format keys, and a connectivity information key, and where a fail-over operation of the cluster group can be performed from the first cluster node to the second cluster node.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Embodiments of the invention are applicable in the cluster application environment. Embodiments of the invention provide a process to allow the creation of new facilities on both nodes in a cluster configuration. In one embodiment, a method for creating new facilities includes, creating a new facility, configuring for registry replication, and resetting of security settings on the receiving cluster node.

Embodiments of the invention may provide the advantages of requiring no modification to an eRoom application code and/or allowing for multiple facilities to be replicated in a robust manner. In particular, embodiments of the invention advantageously solve the problem of creating new facilities on a second cluster node in a cluster configuration.

An overview discussion is first presented on a method for creating a cluster configuration with servers using structured query language (SQL). This method is discussed below with reference to FIG. 1 and FIG. 2 and is discussed in further detail in the above-referenced U.S. patent application Ser. No. 10/097,989, by Troy C. Whitlow, filed Mar. 13, 2002, and entitled "HIGH AVAILABILITY ENHANCEMENT FOR SERVERS USING STRUCTURED QUERY LANGUAGE (SQL)", which is hereby fully incorporated herein by reference.

Figure 1:
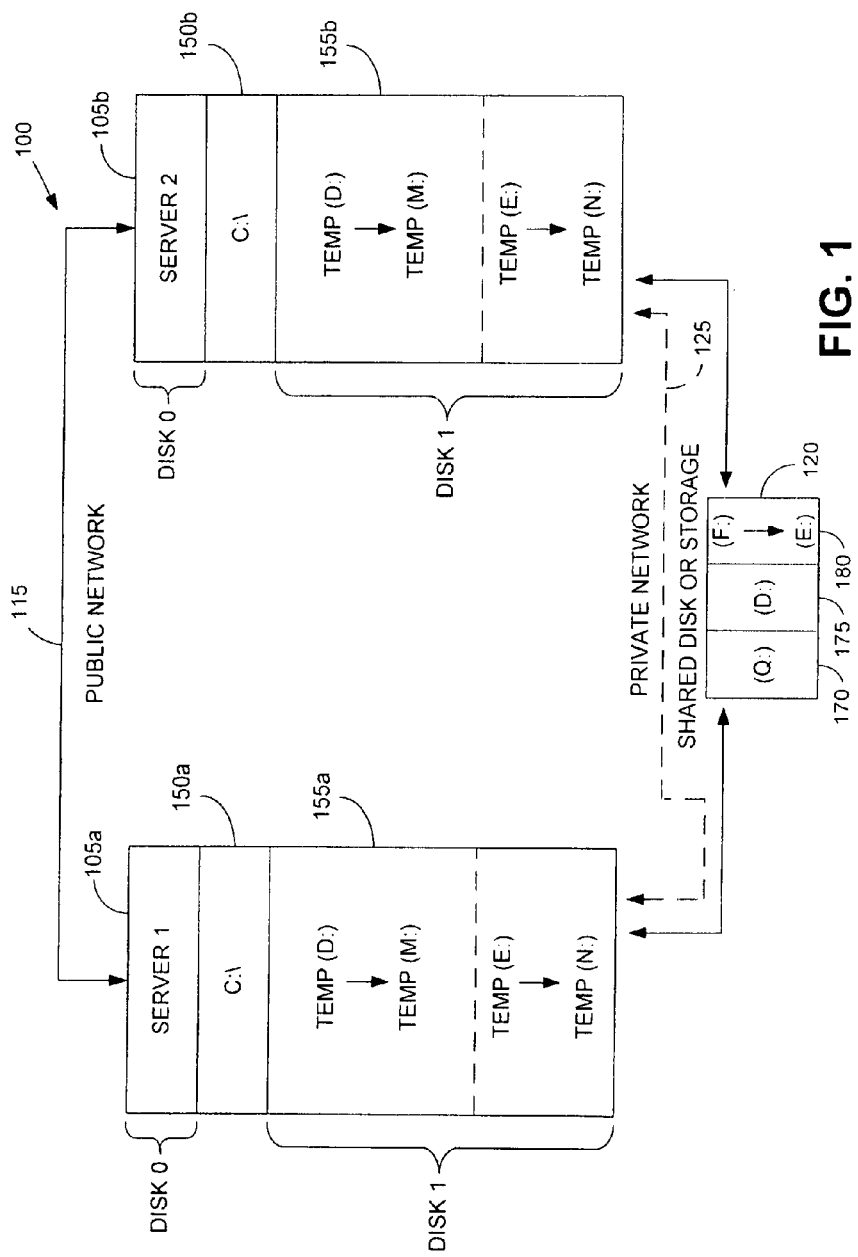
FIG. 1 is a block diagram of an apparatus in accordance with an embodiment of the invention.

FIG. 1 is a block diagram of an apparatus 100 in accordance with an embodiment of the invention. It is noted that the elements, identifying names, and/or states shown in FIG. 1 are not necessarily all present at a given time. Various elements, identifying names, and/or states are shown in FIG. 1 for purposes of describing a functionality of an embodiment of the invention and should not be construed to limit the scope of the invention.

In an embodiment, the apparatus 100 includes a first server (server 1) 105a connected to a second server (server 2) 105b via a public network 115 such as, for example, a local area network (LAN). Both servers 105a and 105b can access a shared storage system 120. The node cluster configuration (hereinafter "cluster") in FIG. 1 is defined by the servers 105a and 105b, shared storage system 120, and private network 125 for transmitting heartbeat traffic.

In one embodiment, the servers 105a and 105b are of the same type so that the similar hardware between the two servers 105a and 105b improves performance from a standard-standpoint. However, it is not a requirement that both servers 105a and 105b are of the same type of hardware.

In one embodiment, the server 105a may include eRoom resources, while the server 105b may include SQL resources. As known to those skilled in the art, SQL is a standardized query language for requesting information from a database. The servers 105a and 105b can be any type of machine that use SQL and are not necessarily limited to a requirement of using eRoom resources.

As described below, in an embodiment, an eRoom instance is created in the appropriate cluster resources. Additionally, an SQL instance is configured to provide database protection. Each server (or node) in the cluster has a specific function. The first server 105a is, for example, the primary owner of the eRoom virtual server, while the second server 105b is, for example, the primary owner of the SQL virtual server. This permits optimal performance for each instance, with system resources available for virtual servers to fail-over. Each virtual server includes the needed resources necessary for eRoom and SQL to function in the cluster. For example, the resource group for eRoom to function in the cluster may include the elements shown in Table 1.

TABLE 1

| eRoom resource group |
| --- |
| physical disk |
| Internet Protocol (IP) address |
| network name |
| IIS Admin service |
| World Wide Web Services service |
| Simple Mail Transport Protocol Service |
| FTP Publishing service |
| Internet Information Server (IIS) |
| virtual root default File Transfer |

TABLE 1-continued

| eRoom resource group |
| --- |
| Protocol (FTP) |
| IIS virtual root - default web |
| eRoom scheduler service |
| eRoom extension manager service |
| ERoom Diagnostics service |

As another example, the resource group for SQL to function in the cluster may include the elements shown in Table 2.

TABLE 2

| SQL resource group |
| --- |
| physical disk |
| SQL IP address |
| SQL network name |
| SQL server |
| SQL agent |
| SQL full text |

Both servers 105a and 105b in the cluster are typically designed with enough system resources to handle the load of resources that are failed over to the surviving server (node). If a server (node) owning the eRoom resource were to fail, the resources would move automatically to the other server (node) and resume service. The same is true for the SQL instance, where during a failure of a server (node) that owns the SQL resources, the resources would move automatically to the surviving server (node). The operation of an embodiment of an apparatus 100 is described in conjunction with the flowchart shown in FIG. 2.

Figure 2:
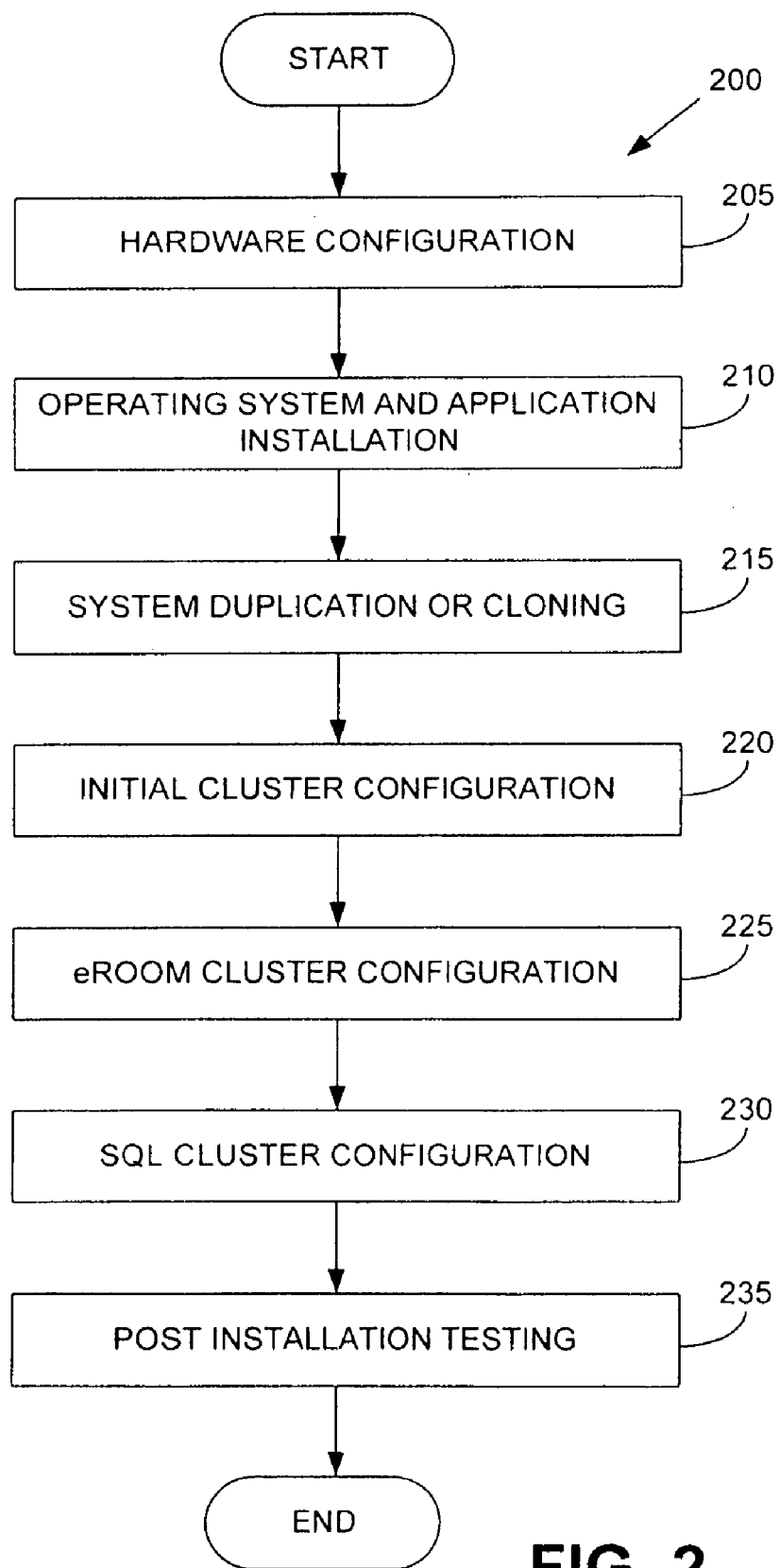
FIG. 2 is a high-level flowchart of a method in accordance with an embodiment of the invention.

FIG. 2 is a high-level flowchart illustrating a process or method 200 of enhancing the eRoom application to provided for high availability without the need for any modification to the eRoom source code or any custom programming, in accordance with an embodiment of the invention. This process 200 includes the cloning of servers (nodes) to each run eRoom independently with identical data. Once the clone is complete, the eRoom data is migrated to a clustered disk environment (i.e., a shared storage system 120), along with the necessary cluster resources. Additionally, the SQL servers servicing the cloned machines are removed and a clustered instance of SQL is used for the final configuration.

An embodiment of the process 200 for enhancing the eRoom application to provide for high availability, in accordance with an embodiment of the invention, is now discussed. It is noted that the names used to identify the elements or actions in the drawings (e.g., "C:\" disk, "D:" disk, "E:" disk, "M:" disk, "Q:\" disk, and/or the like) are only provided as some possible examples to identify the elements or actions, and other names may be used as well to identify the elements and actions shown in the drawings and discussed in the text.

Hardware Configuration (Action 205)

In action (205), all necessary hardware for clustering (or cluster configuration) is installed in the servers 105a and 105b. The hardware to be installed includes, for example, a Small Computer System Interface (SCSI) controller that is cluster-capable and additional network interface cards (NICs) for the networking functions. All hardware devices are typically installed in the same slots for each of the servers 105a and 105b. Additionally, in one embodiment, the hardware is check for compliance with the Microsoft Hardware Compatibility List (HCL).

Operating System and Application Installation (Action 210)

In action (210), an operating system is first installed in one of the servers (e.g., first server 105a). For example, the operating system is the Windows 2000 Advanced Server Application which may be installed in a (C:\) disk (memory 150a). By use of the operating system, a temporary (D:) disk and temporary (E:) disk are created in a non-shared disk subset (or memory 155a). The temporary (D:) disk and temporary (E:) disk are partitioned in the memory 155a.

Also, in action (210), a standard SQL installation is performed. SQL program files may be installed in the (C:\) disk, and SQL data files may be installed in the (E:) drive. The server 105 is restarted after completing the SQL installation.

Also, in action (210) a standard eRoom application installation is performed. For example, the eRoom 5.x SQL version is installed in the server 105a. Scripts files and eRoom setup files may be installed to a default path (C:\Inetpub) in the (C:\) disk, and eRoom program files and eRoom server data may be installed in the (D:) disk.

Thus, the server 105 is now fully functional as a standalone server with eRoom and SQL functionality.

System Duplication or Cloning (Action 215)

In action (215), an image or snapshot of the server 105a is taken and duplicated in the server 105b. Two different methods may be used to duplicate or clone an image or snapshot of the server 105a. First, standard backup software may be used to clone the image or snapshot of the server 105a. The backup software will perform a full backup of the images in the first server 105a to the second server 105b. The use of a standard backup software for cloning typically requires a minimum operating software image to first be installed in second server 105b and empty (D:) and (E:) disk spaces be present in the second server 105b prior to the cloning action. Additionally, the standard backup software typically requires the name of the second server 105b to be changed to the name of the first server 105a.

Alternatively, a disk imaging product may be used to clone the image or snapshot of the server 105a. An example of a suitable disk imaging product is of type such as NORTON GHOST from SYMANTEC CORPORATION.

Thus, in action (215), the (C:\) disk image or snapshot in memory 150a of server 105a is cloned into a (C:\) disk (memory 150b) of second server 105b. The (D:) and (E:) disk images or snapshots in memory 155a of server 105a is cloned into the (D:) disk and (E:) disk (memory 155b) of second server 105b.

The first server 105a is then taken off-line. An IP address and Network Name is assigned to second server 105b. Additionally, other appropriate networking properties are changed in the second server 105b. The first server 105a is then placed back on-line.

As a result, both servers 105a and 105b can run as stand-alone servers with eRoom and SQL functionality. Both servers 105a and 105b may be tested for correct functionality.

Initial Cluster Configuration (Action 220)

In action (220), the cluster server (shared storage system 120) is installed. An initial cluster configuration procedure is performed for eventually permitting both servers 105a and 105b to function in the clustered environment. As shown in FIG. 1, the drive letters of logical disk (D:) in first server 105a is changed to (M:). Similarly, the drive letters of logical disk (D:) in second server 105b is changed to (M:). The drive letters of logical disks (E:) on both servers 105a and 105b are also changed to (N:).

In action (220), in an embodiment, logical disks are created in the available disk sets in the shared cluster disk system 120 (FIG. 1) by use of a Disk Administrator in first server 105a. For example, the following separated disks are created in the shared disk system 120: disk (Q:) (i.e., memory 170) for the cluster Quorum disk, disk (D:) (i.e., memory 175) for eRoom Server Data, and disk (F:) (i.e., memory 180) for SQL installation.

Thus, the first server 105a (or second server 105b) will have six (6) logical drives (three on the non-shared bus and three on the shared cluster bus).

eRoom Cluster Configuration (Action 225)

In action (225), eRoom is first shut down. eRoom program files and eRoom server data in the (M:) disk of, for example, the first server 105a are then copied to the (D:) disk (memory 175) of the shared storage 120. eRoom is again turned on. Testing is also performed to verify that the eRoom cluster resource in the shared storage 120 can move to the second server 105a. Thus, both servers 105a and 105b can use the shared storage 120 to run eRoom. Typically, the eRoom application will run on only one of the nodes (e.g., first server 105a) that owns the disk (D:) in the shared storage 120 (i.e., active/passive state). The shared disk (D:) will move over to the other node (e.g., second server 105b) as part of the cluster on fail-over.

SQL Cluster Configuration (Action 230)

In action (230), all SQL services in both servers 105a and 105b are stopped, and SQL is uninstalled on both servers 105a and 105b. The disk drive letter on first server 105a is changed from (E:) to (N:), and the shared cluster disk (F:) (i.e., memory 180) is changed to (E:). The disk drive letter on the second server 105b is changed from (E:) to (N:).

SQL installation is then performed to install SQL to disk (E:) in the shared storage 120. User databases in the servers 105a and 105b are copied to the disk (E:) in the shared storage 120.

On the first server 105a and second server 105b, all Open Database Connectivity Format (ODBC) connections for the eRoom databases are reset to point the servers 105a and 105b to the shared storage 120. Thus, SQL is now running in a clustered mode, and eRoom is pointing to the databases in the shared storage 120 disk (D:).

The cluster resources on the servers 105a and 105b are set up, and the virtual IIS instances are also set up so that eRoom can run under a virtual name. This permits the use of a one-entry name no matter where eRoom is running (whether eRoom is running on first server 105a or second server 105b).

The temporary disks (M:) and (N:) in the servers 105a and 105b are then removed.

Post Installation Testing (Action 235)

In action (235), eRoom functionality is tested using the virtual web address defined in the eRoom cluster resource setup for verification. The eRoom resource group is moved to second server 105b and tested again. The eRoom resource group is then returned to first server 105a. The SQL resource is also tested by moving the resource back and forth between the servers 105a and 105b.

Figure 3:
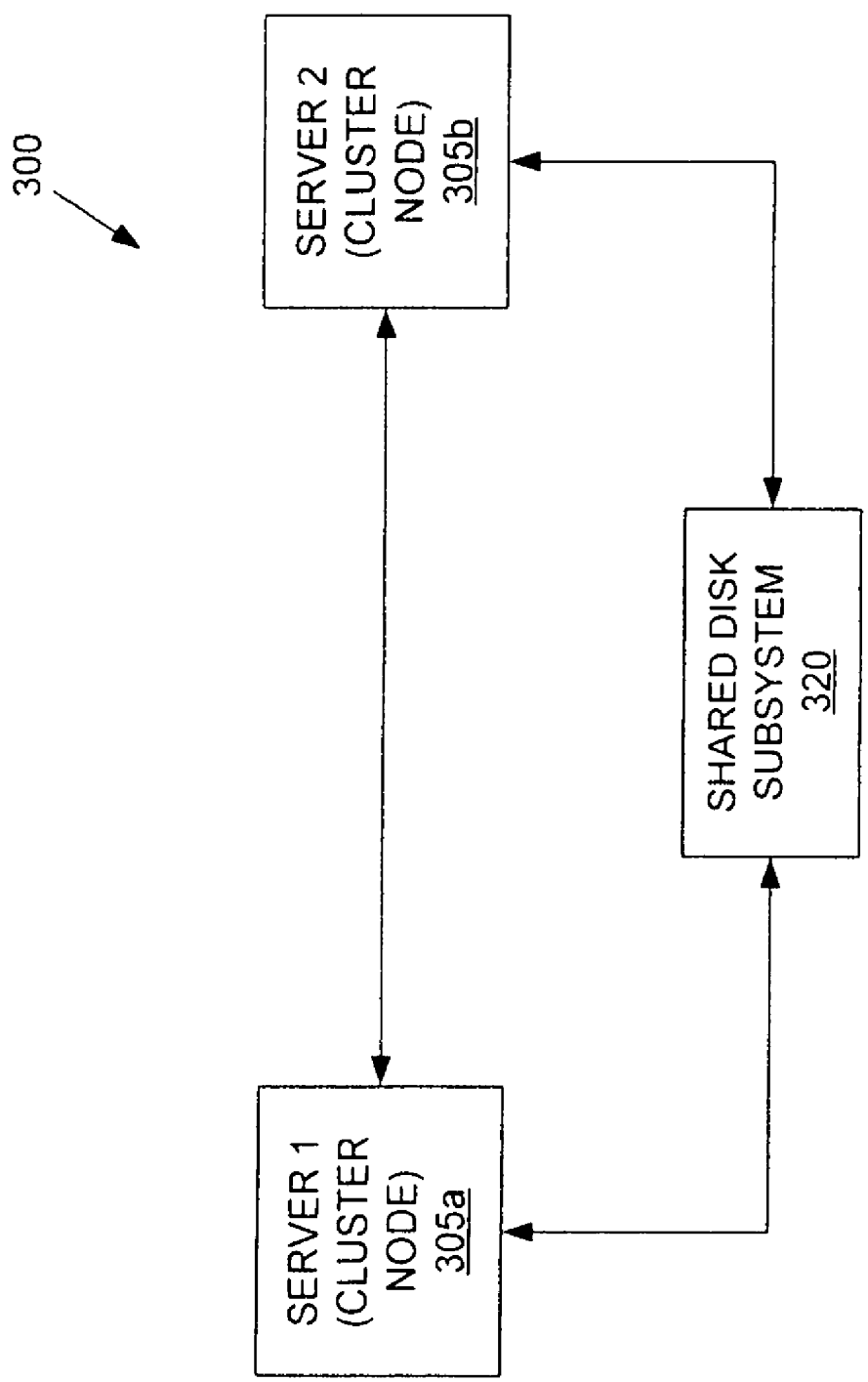
FIG. 3 is a functional block diagram showing an apparatus for clustered eRoom servers with created facilities on both clustered nodes, in accordance with an embodiment of the invention.

FIG. 3 is a block diagram of an apparatus 300 in accordance with an embodiment of the invention. The apparatus 300 includes a first server (server 1 or cluster node) 305a connected to a second server (server 2 or cluster node) 305b.

Both servers 305*a* and 305*b* can access a shared storage system 320, as similarly mentioned above in FIG. 1. The node cluster configuration (hereinafter "cluster") in FIG. 3 is typically defined by the servers 305*a* and 305*b*, shared storage system 320, and a private network for transmitting heartbeat traffic between both servers 305*a* and 305*b*.

In an embodiment of the invention, when a new facility in the eRoom application is created in the first server 305*a*, then a facility creation process permits the facility to also be created in the second server 305*b* for proper operation in the cluster configuration of FIG. 3. Typically, the eRoom application permits the creation of a particular facility only once, and as a result, the second server 305*b* will need notification of the new facility created on the other server 305*a*. In the eRoom application, a facility is simply a group of eRooms that have their own Administrator, licenses, and list of members. Thus, a facility effectively serves as a logical container that contains the "rooms" in the eRoom application. The eRoom application supports multiple facilities per eRoom server.

A non-clustered version of the eRoom application includes a configuration for creating a new facility by use of an administrative web page. The eRoom code would create the facility, build a database for the created facility, and create a data directory for that facility.

Figure 4:
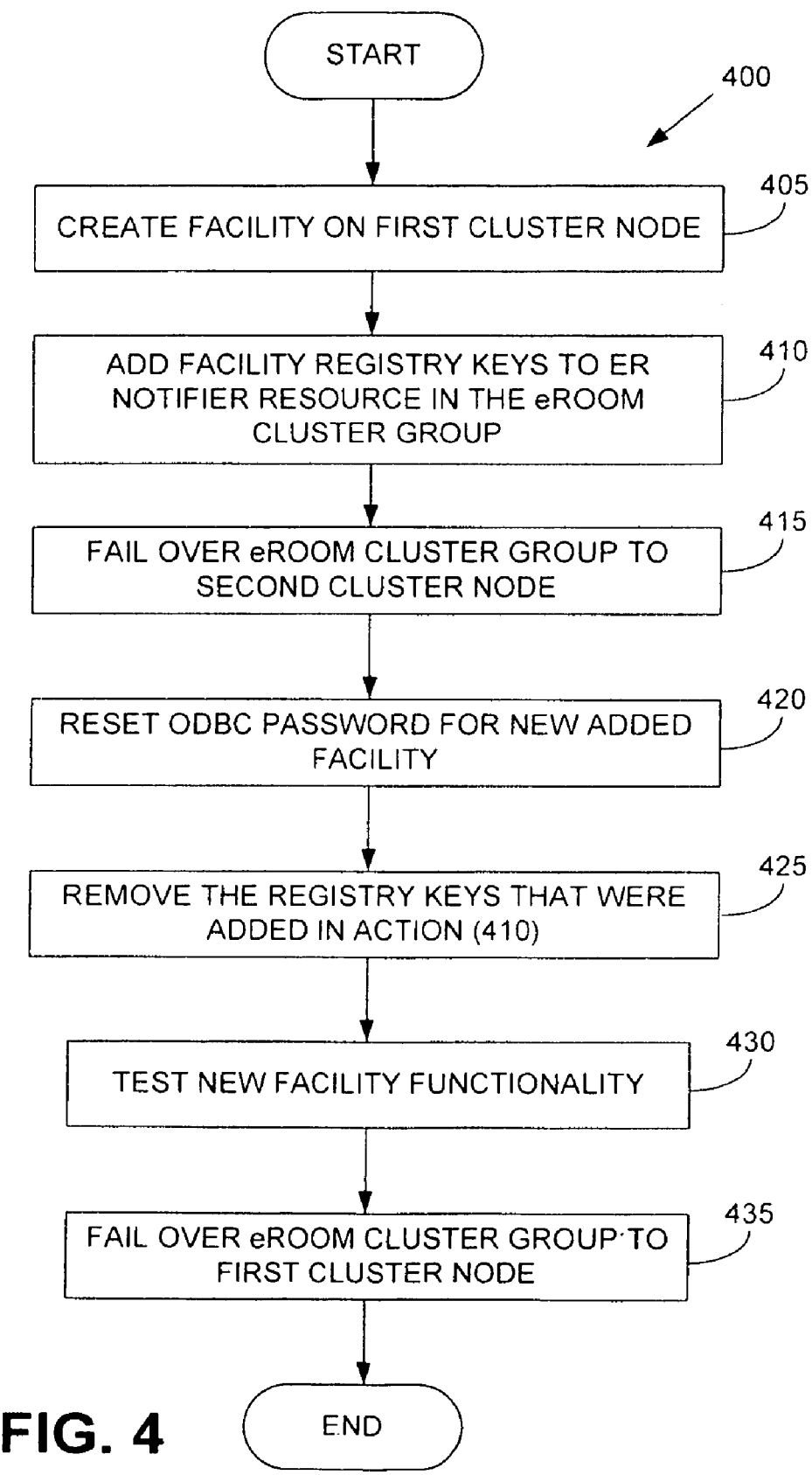
FIG. 4 is a flowchart of a method for creating facilities on clustered nodes, in accordance with an embodiment of the invention.

FIG. 4 is a flowchart of a method 400 for creating facilities on clustered nodes (clustered servers), in accordance with an embodiment of the invention. An eRoom facility is first created (405) on a first cluster node by use of an eRoom functionality. Typically, an administrative web page is used for creating the facility. When a facility is created in the eRoom application, a folder is created in the data directory in the shared disk system 320 (FIG. 3). Facility registry keys are then added (410) to an eRoom resource (known as the eRoom NOTIFIER) in the eRoom cluster group after the new facility has been created on the first cluster node 305*a* (see FIG. 3). The registry keys are obtained and added by use of a suitable registry editor tool such as REGEDIT. In an embodiment of the invention, five (5) particular registry keys are added as shown in Table 3. These keys are used for a facility. Key 1 is a facility key with all information about the new facility. Key 2 is a full text key that has information on how to index the new facility. Keys 3 and 4 are Open Database Connectivity (ODBC) keys that allow connectivity to the new facility from the eRoom application. As known to those skilled in the art, ODBC is an open standard application programming interface (API) for accessing a database. By using ODBC statements in a program, one can access files in a number of different databases, including Access, dBase, DB2, Excel, arid Text. In addition to the ODBC software, a separate module or driver is needed for each database to be accessed.

In particular, Key 3 is a key for indexing so that a cluster node will know how to locate the database for the new facility. Key 4 is an SQL ODBC connection that allows a cluster node to make SQL calls. Key 5 is a key that informs the WINDOWS application in a cluster node about all of the ODBC connections, including the two new ODBC connections relating to Key 3 and Key 4.

TABLE 3

Key 1: HKEY_LOCAL_MACHINE\SOFTWARE\eRoom\eRoom Server\Facilities\<Facility Name>
Key 2: HKEY_LOCAL_MACHINE\SOFTWARE\eRoom\eRoom Server\Full Text\Facilities\<Facility GUID>
Key 3: HKEY_LOCAL_MACHINE\SOFTWARE\ODBC\ODBC.INI\

TABLE 3-continued

ERFT-<Facility Name>
Key 4: HKEY_LOCAL_MACHINE\SOFTWARE\ODBC\ODBC.INI\ Server-<Facility Name>
Key 5: HKEY_LOCAL_MACHINE\SOFTWARE\ODBC\ODBC.INI\ ODBC Data Sources Alternatively, in action (410) the five registry keys may be manually copied to the eRoom NOTIFIER resource, and the keys are then replicated over to the second cluster node during the fail-over operation. In a preferred embodiment, action (410) involves adding the registry keys to the eRoom NOTIFIER resource because the resource uses an integrated replication scheme in the clustering operation with a checkpoint operation to ensure successful replication between the cluster nodes.

A fail-over is then performed (415) to the second cluster node, for the cluster group (i.e., the resource group that owns the eRoom application). During the fail-over, the five keys above are replicated in the second cluster node. A cluster administrator application is typically used for performing the fail-over operation from the fist cluster node to the second cluster node.

A reset is then performed (420) for the ODBC password for the new added facility. The ODBC password is reset because the password is encrypted and is lost during the fail-over operation. An ODBC tool is typically used to reset the password.

The five registry keys are then removed (425). The registry keys are removed from the eRoom NOTIFIER resource. In removing the registry keys from the cluster resource, this prevents replication back to the originating cluster node. These five registry keys were previously added in action (410) above. The cluster administrator is typically used to remove the registry keys.

Tests may then be performed (430) for the functionality of the new facility. A standard web browser functionality may be used to perform the testing operations.

A fail-over is then performed (435) to the first cluster node for the eRoom cluster group. This fail-over operation is performed to insure proper operation of the eRoom resource group in the cluster configuration. The cluster administrator is typically used to perform the fail-over operation. The failover in step (435) is intended to get the application back into the original state prior to adding the facility.

A generic service, such as the eRoom EXTENSION MANAGER application, is used as the cluster resource to permit the replication operation. However, another generic service may alternatively be used as the cluster resource.

The various engines or modules discussed herein may also be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of installing a facility in a clustered server configuration, the method comprising:
    installing a facility on a first cluster node, wherein the facility comprises a logical container that contains a plurality of rooms in an eRoom server application;
    adding facility registry keys to a resource in the cluster group, the registry keys comprising a facility key, a full text key, open database connectivity format keys, and a connectivity information key;
    performing a failover operation of the cluster group from the first cluster node to a second cluster node;
    resetting a password for an open database connectivity for the added facility; and
    removing the added facility registry keys to prevent replication back to the first cluster node.
2. The method of claim 1, further comprising:
    testing the added facility for proper functionality.
3. The method of claim 1, further comprising:
    performing a fail-over operation of the cluster group to the first cluster node.
4. The method of claim 1 wherein the cluster group includes an eRoom cluster group.
5. The method of claim 1, wherein the first cluster node comprises a first server and the second cluster node comprises a second server.
6. The method of claim 1, wherein the facility comprises an eRoom facility.
7. The method of claim 1, wherein the open database connectivity format keys permit the second cluster node to locate the installed facility via the shared disk system and permit one of the cluster nodes to make structured query language calls and wherein the registry keys are replicated in the second cluster node during the fail-over operation.
8. The method of claim 1, wherein the facility is replicated on the second cluster node during the fail-over operation.
9. An apparatus for providing a facility in a cluster server configuration, the apparatus comprising:
    a first cluster node;
    a second cluster node;
    a shared disk system coupled to the first cluster node and second cluster node;
    where a facility can be installed on the first cluster node, wherein the facility comprises a logical container that contains a plurality of rooms in an eRoom server application, where facility registry keys are added to a resource in a cluster group comprising the first cluster node, the second cluster node and the shared disk system, the registry keys comprising a facility key, a full text key, open database connectivity format keys wherein the open database connectivity format keys permit the second cluster node to locate the installed facility via the shared disk system and permit one of the cluster nodes to make structured query language calls, and a connectivity information key, and where a fail-over operation of the cluster group can be performed from the first cluster node to the second cluster node so that the facility is replicated on the second cluster node, wherein the registry keys are replicated in the second cluster node during the fail-over operation and a password for an open database connectivity for the installed facility is reset after the fail-over operation.
10. The apparatus of claim 9, wherein the added facility registry keys are removed to prevent replication back to the first cluster node.
11. The apparatus of claim 9, wherein testing is performed to the added facility for proper functionality.
12. The apparatus of claim 9, wherein another fail-over operation of the cluster group is performed to the first cluster node.
13. The apparatus of claim 9, wherein the cluster group includes an eRoom cluster group.
14. The apparatus of claim 9, wherein the first cluster node comprises a first server and the second cluster node comprises a second server.
15. The apparatus of claim 9, wherein the facility comprises an eRoom facility.
16. The apparatus of claim 9, wherein the open database connectivity format keys permit the second cluster node to locate the installed facility via the shared disk system and permit one of the cluster nodes to make structured query language calls and wherein the registry keys are replicated in the second cluster node during the fail-over operation.

17. The apparatus of claim 9, wherein the facility is replicated on the second cluster node during the fail-over operation.

18. An article of manufacture, comprising:
a machine-readable medium having stored thereon instructions to:
install a facility on a first cluster node, wherein the facility comprises a logical container that contains a plurality of rooms in an eRoom server application;
add facility registry keys to a resource in a cluster group comprising the first cluster node, a second cluster node and a shared disk, the registry keys comprising a facility key, a full text key, open database connectivity format keys, and a connectivity information key;
perform a fail-over operation of the cluster group from the first cluster node to the second cluster node;
reset a password for an open database connectivity for the added facility; and
remove the added facility registry keys to prevent replication back to the first cluster node.

19. The article of claim 18, wherein the first cluster node comprises a first server and the second cluster node comprises a second server.

20. The article of claim 18, wherein the facility comprises an eRoom facility.

21. The article of claim 18, wherein the open database connectivity format keys permit the second cluster node to locate the installed facility via the shared disk system and permit one of the cluster nodes to make structured query language calls and wherein the registry keys are replicated in the second cluster node during the fail-over operation.

22. The article of claim 18, wherein the facility is replicated on the second cluster node during the fail-over operation.

23. An apparatus for installing a facility in a clustered server configuration, the apparatus comprising:
means for installing a facility on a first cluster node, wherein the facility comprises a logical container that contains a plurality of rooms in an eRoom server application;
coupled to creating means, means for adding facility registry keys to a resource in a cluster group comprising the first cluster node, a second cluster node and a shared disk, the registry keys comprising a facility key, a full text key, open database connectivity format keys, and a connectivity information key;
coupled to the adding means, means for performing a fail-over operation of the cluster group from the first cluster node to the second cluster node;
coupled to the performing means, means for resetting a password for an open database connectivity for the added facility; and
coupled to the resetting means, means for removing the added facility registry keys to prevent replication back to the first cluster node.

24. The apparatus of claim 23, wherein the first cluster node comprises a first server and the second cluster node comprises a second server.

25. The apparatus of claim 23, wherein the facility comprises an eRoom facility.

26. The apparatus of claim 23, wherein the open database connectivity format keys permit the second cluster node to locate the installed facility via the shared disk system and permit one of the cluster nodes to make structured query language calls and wherein the registry keys are replicated in the second cluster node during the fail-over operation.

27. The apparatus of claim 23, wherein the facility is replicated on the second cluster node during the fail-over operation.

28. A method of installing a facility in a clustered server configuration, the method comprising:
performing an eRoom cluster configuration procedure to permit one of a first cluster node and a second cluster node to run an eRoom server application that is installed in a shared storage device in the cluster configuration;
installing a facility on a first cluster node, wherein the facility comprises a logical container that contains a plurality of rooms in the eRoom server application;
adding facility registry keys to a resource in a cluster group comprising the first cluster node, the second cluster node and the shared storage device, the registry keys comprising a facility key, a full text key, open database connectivity format keys, and a connectivity information key;
performing a fail-over operation of the cluster group from the first cluster node to the second cluster node, with the registry keys being replicated in the second cluster node during the fail-over operation;
resetting a password for an open database connectivity for the added facility; and
removing the added facility registry keys to prevent replication back to the first cluster node.

29. The method of claim 28, further comprising:
testing the added facility for proper functionality.

30. The method of claim 28, further comprising:
performing a fail-over operation of the cluster group to the first cluster node.

31. The method of claim 28 wherein the cluster group includes an eRoom cluster group.

32. The method of claim 28, wherein the first cluster node comprises a first server and the second cluster node comprises a second server.

33. The method of claim 28, wherein the facility comprises an eRoom facility.

34. The method of claim 28, wherein the open database connectivity format keys permit the second cluster node to locate the installed facility via the shared disk system and permit one of the cluster nodes to make structured query language calls and wherein the registry keys are replicated in the second cluster node during the fail-over operation.

35. The method of claim 28, wherein the facility is replicated on the second cluster node during the fail-over operation.

36. An apparatus for installing a facility in a clustered server configuration, the apparatus comprising:
means for performing an eRoom cluster configuration procedure to permit one of a first cluster node and a second cluster node to run an eRoom server application that is installed in a shared storage device in the cluster configuration;
means for installing a facility on a first cluster node, wherein the facility comprises a logical container that contains a plurality of rooms in the eRoom server application;
coupled to the creating means, means for adding facility registry keys to a resource in a cluster group comprising the first cluster node, the second cluster node and the shared storage device, the registry keys comprising a facility key, a full text key, open database connectivity format keys, and a connectivity information key;
coupled to the adding means, means for performing a fail-over operation of the cluster group from the first cluster node to the second cluster node, with the registry keys being replicated in the second cluster node during the fail-over operation;

coupled to the performing means, means for resetting a password for an open database connectivity for the added facility; and coupled to the resetting means, means for removing the added facility registry keys to prevent replication back to the first cluster node.

37. The apparatus of claim 36, wherein the first cluster node comprises a first server and the second cluster node comprises a second server.

38. The apparatus of claim 36, wherein the facility comprises an eRoom facility.

39. The apparatus of claim 36, wherein the open database connectivity format keys permit the second cluster node to locate the installed facility via the shared disk system and permit one of the cluster nodes to make structured query language calls and wherein the registry keys are replicated in the second cluster node during the fail-over operation.

40. The apparatus of claim 36, wherein the facility is replicated on the second cluster node during the fail-over operation.

41. An article of manufacture, comprising:
a machine-readable medium having stored thereon instructions to:
perform an eRoom cluster configuration procedure to permit one of a first cluster node and a second cluster node to run an eRoom server application that is installed in a shared storage device in the cluster configuration;
install a facility on a first cluster node, wherein the facility comprises a logical container that contains a plurality of rooms in the eRoom server application;
add facility registry keys to a resource in a cluster group comprising the first cluster node, the second cluster node and the shared storage device, the registry keys comprising a facility key, a full text key, open database connectivity format keys, and a connectivity information key;

perform a fail-over operation of the cluster group from the first cluster node to the second cluster node, with the registry keys being replicated in the second cluster node during the fail-over operation;

reset a password for an open database connectivity for the added facility; and remove the added facility registry keys to prevent replication back to the first cluster node.

42. The article of claim 41, wherein the first cluster node comprises a first server and the second cluster node comprises a second server.

43. The article of claim 41, wherein the facility comprises an eRoom facility.

44. The article of claim 41, wherein the open database connectivity format keys permit the second cluster node to locate the installed facility via the shared disk system and permit one of the cluster nodes to make structured query language calls and wherein the registry keys are replicated in the second cluster node during the fail-over operation.

45. The article of claim 41, wherein the facility is replicated on the second cluster node during the fail-over operation.

* * * * *